United States Patent
Kurtz et al.

(10) Patent No.: US 7,108,929 B2
(45) Date of Patent: Sep. 19, 2006

(54) FUEL AND AIR FLOW CONTROL IN A MULTI-STACK FUEL CELL POWER PLANT

(75) Inventors: Jennifer M. Kurtz, Manchester, CT (US); Thomas A. Brindley, Livonia, MI (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 387 days.

(21) Appl. No.: 10/666,566

(22) Filed: Sep. 22, 2003

(65) Prior Publication Data

US 2005/0064269 A1    Mar. 24, 2005

(51) Int. Cl.
*H01M 8/00* (2006.01)
*H01M 2/14* (2006.01)
(52) U.S. Cl. .......................... 429/13; 429/39
(58) Field of Classification Search .......... 429/38, 429/34, 13, 39
See application file for complete search history.

(56) References Cited

U.S. PATENT DOCUMENTS

| | | | |
|---|---|---|---|
| 6,692,859 B1 * | 2/2004 | Mukerjee et al. | 429/34 |
| 6,739,302 B1 * | 5/2004 | Jones et al. | 123/184.61 |
| 2006/0099464 A1 * | 5/2006 | Perry | 429/12 |

FOREIGN PATENT DOCUMENTS

EP      0 263 052    * 1/1987

* cited by examiner

*Primary Examiner*—Patrick Joseph Ryan
*Assistant Examiner*—Thomas H. Parsons
(74) *Attorney, Agent, or Firm*—William W. Jones

(57) ABSTRACT

A fuel cell power plant includes a plurality of fuel cell stacks which are operatively associated with each other so that both the air stream and fuel stream for the stacks are shared by each of the stacks in the power plant. The air and fuel streams are fed into an initial stack stage in the power plant, and after the air and fuel streams pass through the initial stack stage, the fuel exhaust streams are then fed into one or more subsequent stack stages in the power plant. The fuel streams are passed from the initial fuel cell stack stage to the subsequent fuel cell stack stage by means of a common manifold on which each of the fuel cell stacks in the power plant is mounted. The air streams are routed to all of the fuel cell stacks via a channel in the common manifold.

17 Claims, 4 Drawing Sheets

FUEL AND AIR FLOW CONTROL IN A MULTI-STACK FUEL CELL POWER PLANT

TECHNICAL FIELD

The present invention relates to a method and system for controlling the flow of air and fuel to a plurality of fuel cell stacks in a multi-stage fuel cell power plant wherein at least two fuel cell stacks in a first stage in the power plant are connected in tandem with one or more additional fuel cell stack(s) in a second stage in the power plant. More particularly, this invention relates to a method and system of the character described wherein all of the fuel cell stacks in the power plant are mounted on a common air and fuel-distributing manifold which feeds fuel to the fuel cell stacks in the first stage and then feeds first stage fuel exhaust to the fuel cell stack(s) in the second stage, whereby all of the fuel cell stacks in the power plant are operated with a single stream of fuel.

BACKGROUND OF THE INVENTION

Electricity is produced by fuel cell power plants which electrochemically convert a hydrocarbon-containing fuel stream, or a hydrogen stream, and an air stream into electrons and water. A fuel cell power plant can consist of a single fuel cell stack, or multiple fuel cell stacks. The choice of power plant configurations can depend on the desired electrical power output, and/or also on the available space that the power plant can occupy.

When the utility of having a plurality of interconnected fuel cell stacks is desirable, it has been suggested that fuel cell stacks in the power plant can be connected together in tandem, so that the fuel exhausted from a first stage of the stacks in the power plant can be routed to one or more fuel cell stack(s) in a second stage of the power plant and used as a fuel supply for the stack(s) in the second stage of the power plant. A schematic illustration of such a system is disclosed in European Patent Specification No. 0 263 052 B1, published Feb. 27, 1991. This patent publication shows multi stack fuel cell power plants wherein the stacks are supplied with reactants in parallel, in FIG. 1, and also wherein the stacks are supplied with reactants in tandem in FIGS. 2 and 3. The system described in the aforesaid patent publication suggests the use of a plurality of modular building block-type units for the several stages in the power plant. This approach involves the use of a plurality of reactant transfer lines from one stage to the next, which can become complicated and require complicated reactant transfer line assemblies.

It would be desirable to be able to utilize the tandem or serial connection approach for a multi-fuel cell stack power plant with a simplified connection between the individual stacks in the first stage of the power plant, and between the first stack stage and the second stack stage in the power plant. We have devised a single manifold structure which accomplishes the aforesaid desirable and simplified result.

DISCLOSURE OF THE INVENTION

This invention relates to a multi-fuel cell stack power plant which employs a simplified fuel and air distribution mechanism. The power plant of this invention includes a plurality of separate fuel cell stacks which utilize common fuel and air streams to produce electricity. The fuel cell stacks are connected in parallel and in tandem so that a plurality of stacks form a first stage in the power plant, and one or more additional stacks form a second stage in the power plant. All of the stacks in each stage of the power plant are operatively connected to an intermediate fuel and air distribution manifold which directs fuel exhausted from the stacks in the first stage to the stack(s) in the second stage. The stacks in the first stage are fueled in parallel, and the stack(s) in the second stage are fueled in tandem with the first stage. The transfer of fuel from the first stage to the second stage is accomplished with minimum and uniform gas pressure drop so as to ensure that there will be no maldistribution of flow in the manifold from the first stage stacks to the second stage stacks. The use of the distribution manifold enables one to form a more compact power plant and to uniformly distribute and collect reactants to each fuel cell stack in the power plant. The uniform collection/distribution of the flows, with minimal pressure drop, ensures that the fuel cell stacks will perform as predicted.

The manifold includes a fuel passage which receives fuel exhausted from the fuel cell stacks in stage one and directs that exhausted fuel to the fuel cell stack(s) in stage two. The manifold also includes a fuel passage which receives fuel exhausted from the fuel cell stack(s) in stage two, combines with air exhaust, and exhausts that depleted fuel and air from the power plant. The manifold also includes a flow passage to uniformly distribute air from an air blower to each fuel cell stack in the power plant. The air from each fuel cell stack is also collected in the manifold, which is sent to another component and then combined with the fuel exhaust from the fuel cell stack(s) in the second stage to exit the power plant. The manifold includes mounting pins which properly align the fuel cell stacks that are mounted on the manifold. The various passages are sized so as to ensure that there will be a low pressure drop in reactant gases flowing from the first stage to the second stage so that the power plant can operate at substantially ambient pressure. As noted above, the fuel stream reactant is fed to the tandem stages of fuel cell stacks via the manifold, while the air reactant is fed to the fuel cell stacks in parallel via the manifold.

It is therefore an object of this invention to provide a multi-stack fuel cell power plant which includes a first stack stage comprising a plurality of fuel cell stacks, and a second stack stage comprising one or more additional fuel cell stacks, wherein the stacks in each stage are all fueled by a common fuel stream.

It is an additional object of this invention to provide a fuel cell power plant of the character described wherein the fuel cell stack(s) in the second stage are fueled with fuel exhausted by the stacks in the first stage.

It is a further object of this invention to provide a fuel cell power plant of the character described wherein the stacks in both stages are mounted on a common reactant transfer manifold so as to minimize the volume of the plant and simplify plant assembly by minimizing the number of reactant flow connections in the plant and thereby minimize plant assembly errors.

It is yet another object of this invention to provide a fuel cell power plant of the character described wherein the manifold includes gas passages which transfer fuel gas exhausted from the fuel cell stacks in the first stage to fuel cell stack(s) in the second stage with a minimum pressure drop and in a manner which provides for uniform flow from the first stage stacks to the second stage stacks.

It is still another object of this invention to provide a fuel cell power plant of the character described wherein the manifold also controls the flow of air to and from the fuel cell stacks in the stages of the power plant in a uniform and low pressure drop manner.

BRIEF DESCRIPTION OF THE DRAWINGS

These and other objects and advantages of this invention will become more readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
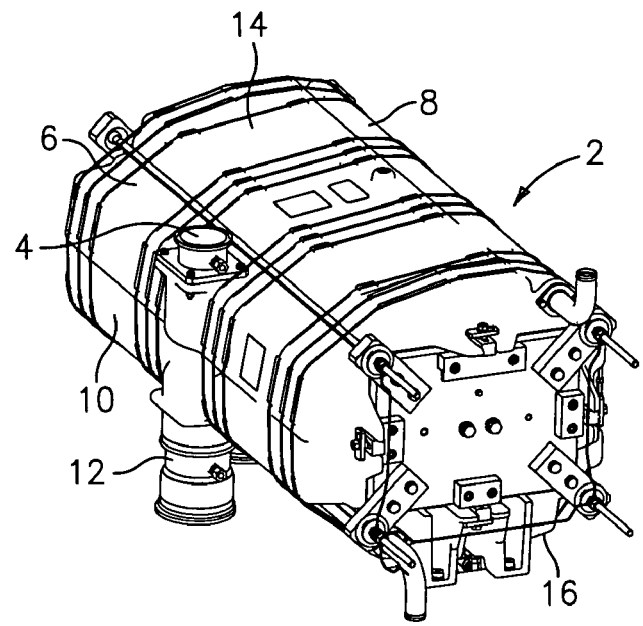
FIG. 1 is a perspective view of one of the fuel cell stacks which is suitable for use in connection with this invention.

Referring now to the drawings, FIG. 1 is a perspective view of a fuel cell stack which is configured for use in connection with the multi-stage, multi-stack fuel cell power plant formed in accordance with this invention, which stack is denoted generally by the numeral 2. The stack 2 has a fuel inlet connection 4 which opens into a fuel inlet manifold 6. The fuel inlet manifold 6 feeds fuel through the cells 14 in the stack 2 to a fuel reversal flow manifold 8 on the opposite side of the stack 2, whereupon the fuel flows back to a fuel outlet manifold 10. The fuel stream exits the stack 2 via a fuel outlet connection 12. Air is passed through the cells in the stack via the inlet and outlet manifold 16.

Figure 2:
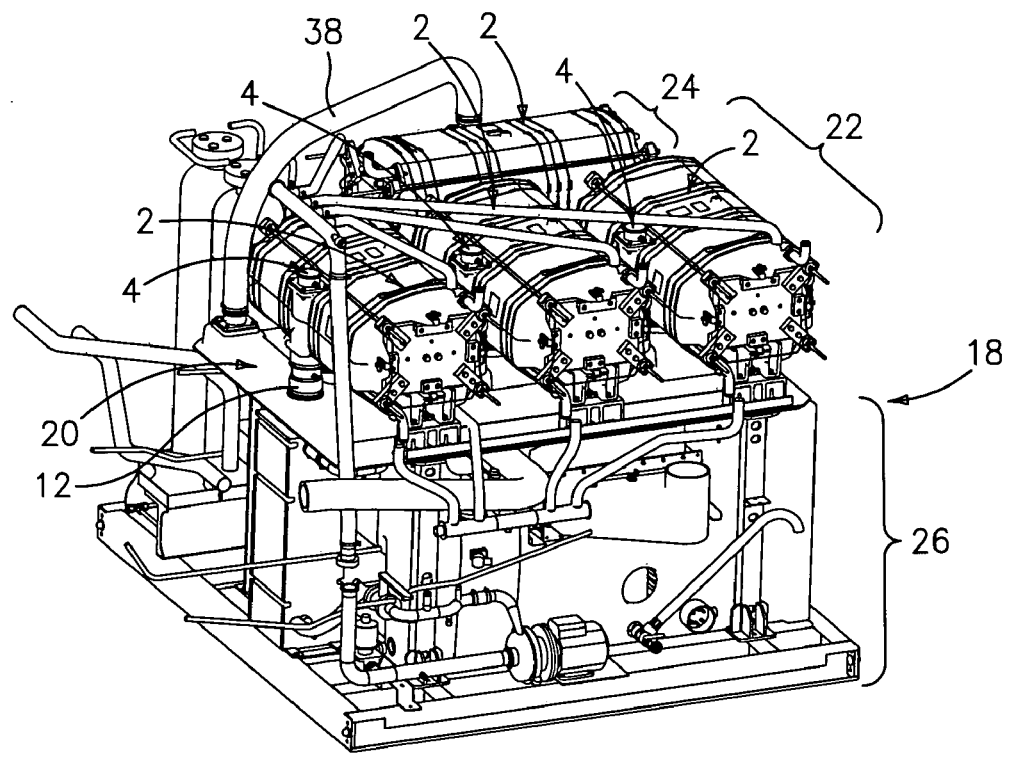
FIG. 2 is a perspective view of a two stage multi-fuel cell stack power plant formed in accordance with this invention.

Referring now to FIG. 2, there is shown a modular fuel cell power section which is designated generally by the numeral 18. The power section 18 includes four fuel cell stacks 2 which are all mounted on a common gas distribution manifold 20. The stacks 2 are grouped into two stages which are a first stage 22, and a second stage 24. The first stage 22 includes three of the fuel cell stacks 2, and the second stage 24 includes one additional fuel cell stack 2. The power section 18 also includes a water and air management assembly component 26 which is a conventional fuel cell power plant assembly component.

Figure 3:
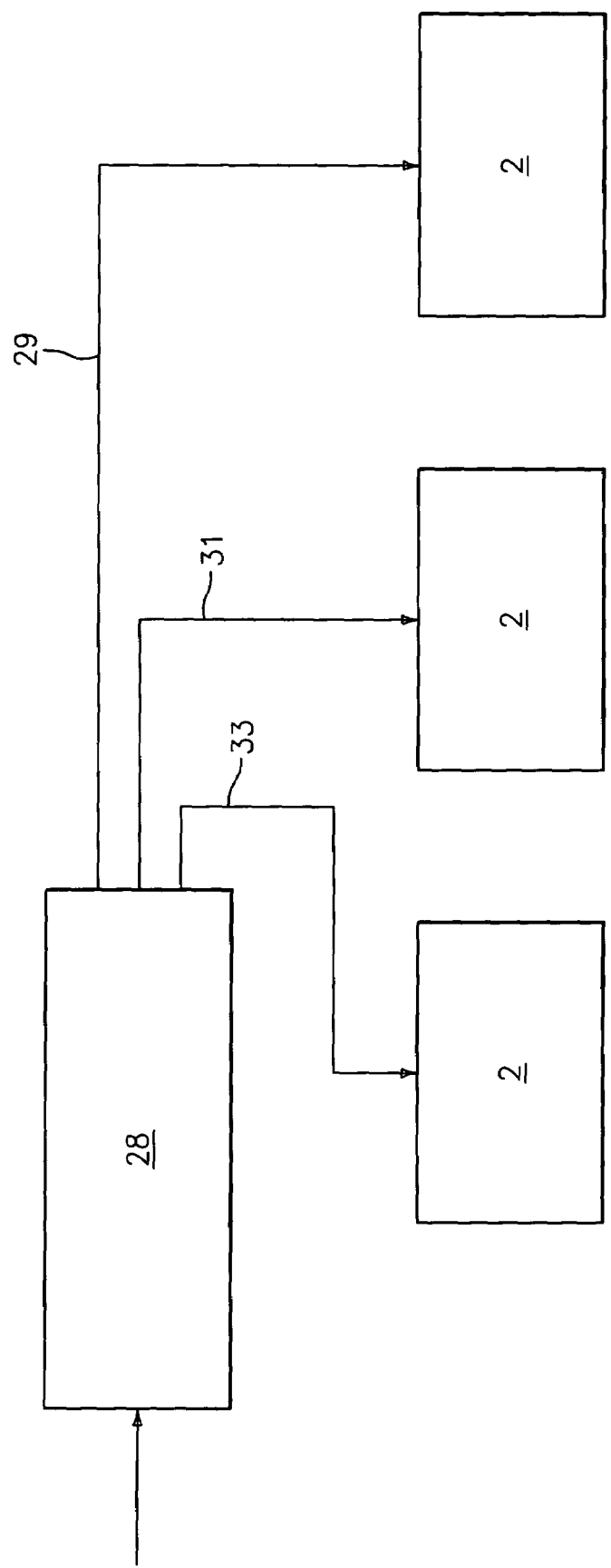
FIG. 3 is a schematic view of a fuel feed system for feeding fuel to the stacks in the first stage of the power plant of FIG. 2.

FIG. 3 is a schematic depiction of a fuel feeding system for providing fuel to the three stacks 2 in the first stage 22 of the power section 18. The system shown in FIG. 3 includes an inlet fuel source 28 and first, second and third branches 29, 31 and 33 that supply fuel to the fuel cell stacks 2 in the first stage 22 of the power section 18.

Figure 4:
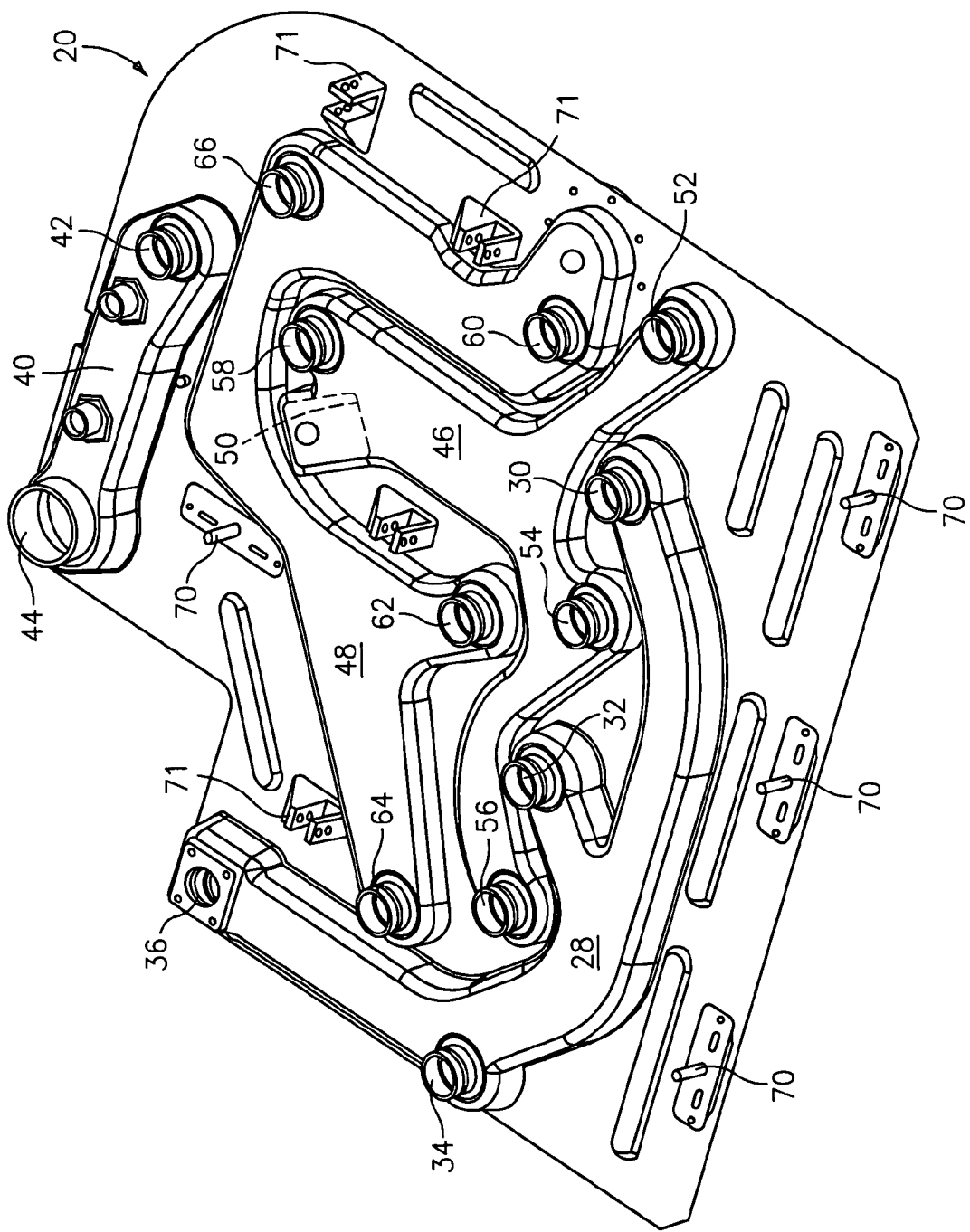
FIG. 4 is a perspective top view of a fuel and air distributing manifold for use in the power plant of FIG. 2 that is formed in accordance with this invention.
Figure 5:
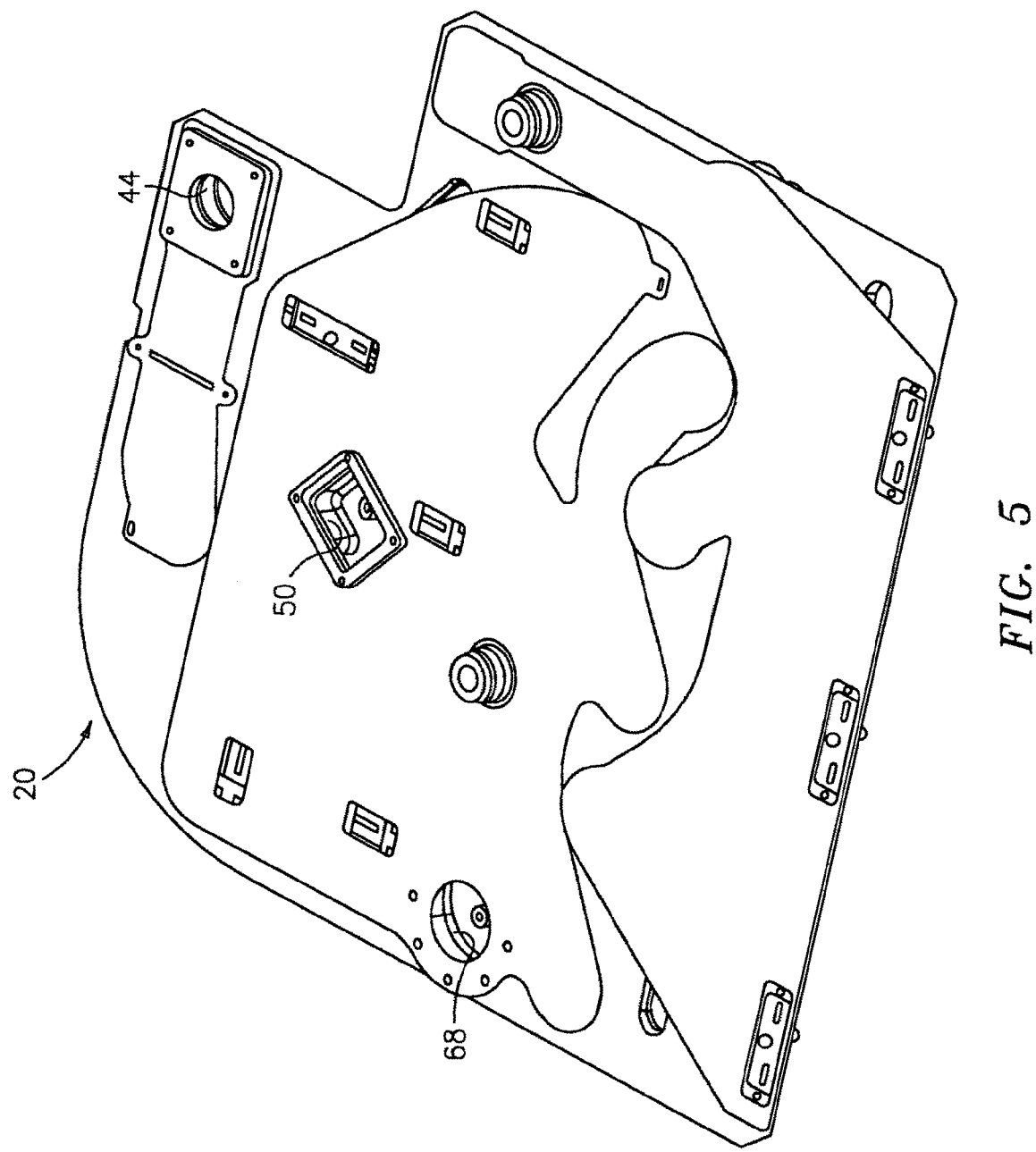
FIG. 5 is a perspective view of the undersurface of the manifold of FIG. 4.

Referring now to FIGS. 4 and 5, FIG. 4 is a perspective view of the upper surface of the manifold 20 shown in FIG. 2, and FIG. 5 is a perspective view of the lower surface of the manifold 20. The manifold 20 that is shown in the drawings can be formed from an assembly of thermoformed parts, preferably by twinsheet thermoforming.

Referring first to FIG. 4, the manifold 20 includes a plurality of gas passages which route air and fuel to the various fuel cell stacks 2 in the power plant section 18. Gas passage 28 is a fuel gas passage through which fuel exhausted from the stacks 2 in the first stage 22 of the power plant section 18 is fed to the stack(s) 2 in the second stage 24 of the power plant section 18. The passage 28 includes three nozzles 30, 32 and 34 which receive fuel exhausted from the respective stacks 2 in the first stage 22. A fourth nozzle 36 is a fuel exit nozzle through which fuel from the passage 28 is fed into a tube 38 (see FIG. 2) which connects the passage 28 with the stack(s) in the second stage 24 of the power plant power section 18. The manifold 20 also includes a fuel exhaust passage 40 having a first nozzle 42 through which fuel is exhausted from the stack(s) 2 in the second stage 24, and a second nozzle 44 through which fuel is exhausted from the power plant section 18. Thus, in the embodiment shown in FIG. 2, fuel is exhausted from stacks one, two and three in the first stage 22, flows through the passage 28, and thence through the tube 38 into stack four in the second stage 24. The fuel exits stack four and also the power plant section 18 through passage 40. It will be appreciated that all of the stacks 2 are mounted on the manifold 20 thus enabling the manifold 20 to provide a simplified and compact fuel flow path for the stacks 2 in the power plant section 18.

The manifold 20 also includes two air flow control passages 46 and 48. The air flow passage 46 is an air passage which delivers air from a blower at the connection 50 on the underside of the manifold 20 (see FIG. 5) to each fuel cell stack 2. The air inlet passage 46 includes four nozzles 52, 54, 56 and 58 which are connected to the air inlet manifolds on stacks one, two, three and four, respectively. Thus, the air inlet passage 46 serves to duct air from the opening 50 to each of the stacks in the power plant section 18. The air outlet passage 48 also includes four nozzles 60, 62, 64 and 66 which are connected to the air outlet manifolds on stacks one, two, three and four, respectively. Thus the air outlet passage 48 receives air exhausted from the four stacks shown in FIG. 2, and that air is in turn, routed from the power plant section 18 through a nozzle 68 on the underside of the manifold 20 (see FIG. 5) to the nozzle 44 whereupon it is exhausted from the power plant section 18. The manifold 20 is also provided with a plurality of alignment posts 70 and brackets 71 which serve to properly orient and secure the stacks 2 on the manifold 20.

The manifold 20, which we refer to as a "fluid circuit board", is designed by laying out the respective positions of the flow channels 28, 40, 46 and 48 to correspond to each fuel cell stack connection; being based on the size and location of each of the stacks in the power plant and the allocated assembly volume. The flow channel designs of the manifold 20 are preliminary sized based on a maximum acceptable fluid flow velocity. Once the layout of the fluid flow channels and the initial or preliminary fluid flow channel areas are determined, the resultant geometry can be inputted into a computational fluid dynamics software program. The fluid circuit board geometry is thus analyzed and modified so as to provide approximately equal distribution to each fuel cell stack assembly, and to minimize pressure drop through the fluid flow channels. Fluid distribution and fluid pressure drop values are allocated to the fluid circuit board based on system requirements and system operation. Structural requirements for the manifold 20 must also be met. A finite element software program is used to analyze the manifold geometry, and the necessary geometry changes are made to meet the resultant requirements. By using the aforesaid analytical tools, the specific design of the fluid flow channels in the manifold 20 can be determined, the goal being to provide approximately equal fluid distribution and minimal pressure drop in each of the manifold channels 28, 40, 46 and 48, as well as meet the structural and volume requirements.

It will be readily appreciated that the multi-channeled manifold of this invention provides a simplified and secure gas flow connection between associated fuel cell stacks in a multi-stack fuel cell power plant wherein there are two tandem stages of fuel cell stacks and a second fuel cell stack stage is fueled with fuel exhausted from a first fuel cell stack stage. The manifold also provides a compact mounting structure for the stacks and the adjunct portions of the power plant so that the entire power plant can be a compact assembly. The power plant configured as set forth in this invention makes more efficient use of the fuel supply by feeding the stack(s) in the second stage with fuel exhausted from stacks in the first stage.

Since many changes and variations of the disclosed embodiment of the invention may be made without departing from the inventive concept, it is not intended to limit the invention otherwise than as required by the appended claims.

What is claimed is:

1. A unitary manifold assembly for use in controlling the flow of reactant gas streams between a plurality of fuel cell stacks in a fuel cell power plant, said manifold assembly comprising a single fuel gas passage having a plurality of fuel gas inlets for selective connection to a plurality of fuel cell stacks in a first stage of power plant fuel cell stacks, said fuel gas passage being operative to receive partially expended fuel gas streams exhausted from said plurality of fuel cell stacks and to combine said partially expended fuel gas streams into a combined fuel gas stream, and said fuel gas passage having a fuel gas outlet for directing the combined fuel gas stream to at least one second stage power plant fuel cell stack whereby the combined fuel gas stream is used to provide fuel for the second stage power plant fuel cell stack, the first and second fuel cell stack stages forming at least a part of a power section of the power plant; said manifold assembly further comprising a fuel gas exhaust passage for operative connection with fuel cell stacks in said second stage thereof, a fuel gas exhaust passage including a fuel gas inlet for receiving spent fuel gas from the fuel cell stacks in said second stage, and a fuel gas outlet for exhausting spent fuel gas from the power section of the power plant.

2. The manifold assembly of claim 1 further comprising at least two separate air reactant flow passages one of which is an air reactant inlet flow passage, and another of which is an air reactant outlet flow passage, said air reactant inlet flow passage having a plurality of outlets which are operatively connectable to separate ones of the fuel cell stacks in the power plant power section so as to direct air into each of the separate fuel cell stacks in the power plant power section, and said air reactant outlet flow passage having a plurality of inlets which are operatively connectable to separate ones of the fuel cell stacks in the power plant power section, whereby said air reactant flow passages are operative to direct an air reactant stream into and out of each of the fuel cell stacks in the power section of the power plant in parallel fashion.

3. The manifold assembly of claim 2 wherein a single air inlet chamber is operatively connected with said air reactant inlet flow passage so as to direct a stream of air to said air reactant inlet flow passage.

4. The manifold assembly of claim 1 wherein said manifold assembly is formed from thermoformed components.

5. The manifold assembly of claim 4 wherein said manifold assembly is formed by twinsheet thermoforming.

6. The manifold assembly of claim 1 wherein said fuel gas passage is sized so as to provide approximately equal distribution of fuel to each fuel cell stack in the at least one second stage power plant fuel cell stack and minimize pressure drop through the fuel gas passage so as to minimize back flow of the fuel gas stream in the fuel gas passage.

7. The manifold assembly of claim 1 wherein said manifold assembly is provided with alignment means for fixedly aligning the fuel cell stacks relative to said manifold assembly fuel gas and air passages.

8. A fuel cell power plant power section assembly comprising:
   a) a plurality of fuel cell stacks, said fuel cell stacks being being divided into at least two stages which are provided by a fuel gas stream in tandem with partially spent fuel from one stage being fed into a subsequent stage, said one stage including a plurality of fuel cell stacks, and said subsequent stage including at least one fuel cell stack; and
   b) a unitary manifold assembly for use in controlling the flow of reactant gas streams between said plurality of fuel cell stacks in said one and said subsequent fuel cell stack stages, said manifold assembly comprising a single fuel gas passage operatively connected to said plurality of fuel cell stacks in said one stage of said fuel cell stacks, said fuel gas passage being operative to receive partially expended fuel gas streams exhausted from said plurality of fuel cell stacks and to combine said partially expended fuel gas streams into a combined fuel gas stream, and said fuel gas passage also being operatively connected to said at least one fuel cell stack in said subsequent stage for directing the combined fuel gas stream to said least one fuel cell stack in said subsequent stage, whereby the combined fuel gas stream is used to provide fuel for the subsequent stage fuel cell stack.

9. The power section assembly of claim 8 wherein said manifold assembly further comprises a single fuel gas stream outlet passage which is operatively connected to said at least one fuel cell stack in said subsequent stage and is operative to channel spent fuel gas from said at least one fuel cell stack in said subsequent stage to remove the spent fuel gas from said power section assembly.

10. The power section assembly of claim 8 wherein said manifold assembly further comprises a single air reactant stream inlet passage and a separate single air reactant stream outlet passage, said air reactant stream inlet passage being operatively connected to each of the fuel cell stacks in each stage of said power section assembly and operative to direct the air reactant into each of said fuel cell stacks in said power section, and said air reactant stream outlet passage being operatively connected to each of the fuel cell stacks in each stage of said power section assembly and operative to receive the air reactant exhausted from each of the fuel cell stacks and duct the air reactant exhaust from said power section.

11. The power section assembly of claim 10 wherein said manifold assembly further comprises an air inlet chamber operatively connected to said single air reactant inlet passage so as to direct a stream of air to said air reactant inlet passage.

12. The power section assembly of claim 8 wherein said manifold assembly is formed from thermoformed components.

13. The power section assembly of claim 12 is formed by twinsheet thermoforming.

14. The power section assembly of claim 8 wherein said single fuel gas passage is sized so as to provide approximately equal distribution of fuel to each fuel cell stack in said subsequent fuel cell stack stage and minimize pressure drop through the fuel gas passage so as to minimize back flow of the fuel gas stream in the single fuel gas passage.

15. The power section assembly of claim 8 wherein said manifold assembly is provided with alignment means for fixedly aligning the fuel cell stacks relative to said manifold assembly fuel gas and air passages.

16. A method for providing a fuel gas reactant and an air reactant to a multistage fuel cell power plant power section which power section includes a first fuel cell stack stage having a plurality of fuel cell stack assemblies, and a subsequent fuel cell stack stage having at least one fuel cell stack assembly, said method comprising the steps of:
   a) providing a one piece reactant transfer manifold assembly which is operatively connected to each of the fuel cell stacks in the power plant power section;
   b) directing streams of a fuel gas into each of the fuel cell stack assemblies in the first fuel cell stack stage; and
   c) combining partially spent fuel gas streams from each of the fuel cell stack assemblies in the first fuel cell stack stage into a single fuel gas stream in the transfer manifold, and directing the combined single fuel gas stream through a single fuel gas passage in the transfer manifold to the at least one fuel cell stack assembly in the subsequent fuel cell stack stage so as to provide a fuel gas stream for the subsequent fuel cell stack stage.

17. The method of claim 16 comprising the further steps of directing air reactant streams through a single air reactant inlet passage in said reactant transfer manifold into all of the fuel cell stack assemblies in the power section; and removing air reactant streams from all of the fuel cell stack assemblies in the power section through a single air reactant outlet passage in said reactant transfer manifold.

* * * * *